United States Patent
Kim et al.

(10) Patent No.: US 9,429,781 B2
(45) Date of Patent: Aug. 30, 2016

(54) FILTER FOR SELECTIVE TRANSMISSION OF VISIBLE RAYS AND INFRARED RAYS USING AN ELECTRICAL SIGNAL

(75) Inventors: Seong Jin Kim, Yongin-si (KR); Do Kyoon Kim, Yongin-si (KR); Kee Chang Lee, Yongin-si (KR); Jeroen Beeckman, Herzele (BE); Albert Theuwissen, Bree (BE)

(73) Assignees: SAMSUNG ELECTRONICS CO., LTD., Gyeonggi-Do (KR); GHENT UNIVERSITY, Ghent (BE)

( * ) Notice: Subject to any disclaimer, the term of this patent is extended or adjusted under 35 U.S.C. 154(b) by 240 days.

(21) Appl. No.: 13/882,358

(22) PCT Filed: Oct. 28, 2011

(86) PCT No.: PCT/KR2011/008119
§ 371 (c)(1),
(2), (4) Date: Dec. 5, 2013

(87) PCT Pub. No.: WO2012/057558
PCT Pub. Date: May 3, 2012

(65) Prior Publication Data
US 2014/0078459 A1 Mar. 20, 2014

Related U.S. Application Data

(60) Provisional application No. 61/408,171, filed on Oct. 29, 2010, provisional application No. 61/418,118, filed on Nov. 30, 2010.

(30) Foreign Application Priority Data

Oct. 27, 2011 (KR) ........................ 10-2011-0110396

(51) Int. Cl.
*C09K 19/60* (2006.01)
*G02F 1/1333* (2006.01)
(Continued)

(52) U.S. Cl.
CPC ......... *G02F 1/1333* (2013.01); *G02F 1/13473* (2013.01); *G02F 1/13475* (2013.01);
(Continued)

(58) Field of Classification Search
CPC ..... G02B 5/208; G02B 5/282; G02F 1/1333; G02F 1/17; G02F 1/19; G02F 1/13342; G02F 1/13473; G02F 1/13475; H04N 5/332; H04N 9/045; H04N 13/0207; H04N 13/025; H04N 13/0257; H04N 13/0271
USPC ........................................................ 349/165
See application file for complete search history.

(56) References Cited

U.S. PATENT DOCUMENTS

| 6,271,899 B1 | 8/2001 | Lewis et al. |
| 6,538,751 B2 | 3/2003 | Ono |

(Continued)

FOREIGN PATENT DOCUMENTS

| JP | 2008-85807 | 4/2008 |
| KR | 10-2004-0072423 | 8/2004 |

(Continued)

OTHER PUBLICATIONS

International Search Report of PCT/KR2011/008119 mailed Jun. 28, 2012.

*Primary Examiner* — Nathanael R Briggs
(74) *Attorney, Agent, or Firm* — Harness, Dickey & Pierce, P.L.C.

(57) ABSTRACT

Disclosed is a filter for selective transmission of visible rays and infrared rays using an electrical signal. The filter comprises: a first filter for controlling the degree of absorption of visible rays by changing the molecular arrangement in accordance with the control of the electrical signal; and a second filter for controlling the degree of reflection of infrared rays by changing reflectivity in accordance with the control of the electrical signal.

19 Claims, 12 Drawing Sheets

(51) Int. Cl.
  *G02F 1/17*     (2006.01)
  *G02F 1/19*     (2006.01)
  *G02F 1/1347*   (2006.01)
  *H04N 5/33*     (2006.01)
  *H04N 9/04*     (2006.01)
  *H04N 13/02*    (2006.01)
  *G02F 1/1334*   (2006.01)
  *G02B 5/20*     (2006.01)

(52) U.S. Cl.
  CPC .................. *G02F 1/17* (2013.01); *G02F 1/19* (2013.01); *H04N 5/332* (2013.01); *H04N 9/045* (2013.01); *H04N 13/0207* (2013.01); *H04N 13/0257* (2013.01); *H04N 13/0271* (2013.01); *G02B 5/208* (2013.01); *G02F 1/13342* (2013.01); *H04N 13/025* (2013.01)

(56) References Cited

U.S. PATENT DOCUMENTS

| 7,372,642 | B2 | 5/2008 | Rohaly et al. | |
| 2005/0036077 | A1* | 2/2005 | Khan et al. | 349/36 |
| 2009/0268273 | A1* | 10/2009 | Powers et al. | 359/288 |

FOREIGN PATENT DOCUMENTS

| KR | 1020040072423 A * | 8/2004 |
| KR | 10-2010-0011676 | 2/2010 |
| KR | 10-2010-0059361 | 6/2010 |
| KR | 10-2011-0011244 | 2/2011 |

\* cited by examiner

301

FILTER A CHARACTERISTIC

302

FILTER B CHARACTERISTIC

<COLOR IMAGE>

<DEPTH IMAGE>

⟶ BACKGROUND IR
--⟶ REFLECTED IR

FILTER FOR SELECTIVE TRANSMISSION OF VISIBLE RAYS AND INFRARED RAYS USING AN ELECTRICAL SIGNAL

CROSS-REFERENCE TO RELATED APPLICATIONS

This application is a U.S. national stage application of PCT/KR2011/008119 filed Oct. 28, 2011 and claims foreign priority benefit of U.S. Provisional Application No. 61/408,171 filed Oct. 29, 2010, U.S. Provisional Application No. 61/418,118 filed Nov. 30, 2010 and Korean Application No. 10-2011-0110396 filed Oct. 27, 2011 in the Korean Intellectual Property Office, the contents of which are incorporated herein by reference.

TECHNICAL FIELD

Example embodiments relate to a filter for transmitting a visible ray and an infrared ray selectively, and more particularly, to a filter for transmitting a visible ray and an infrared (IR) ray selectively using an electrical signal.

BACKGROUND ART

In recent times, digital cameras or camcorders may store photos and images by obtaining color information and brightness information. Such an apparatus may be defined as a two-dimensional (2D) camera system. An apparatus for providing a realistic three-dimensional (3D) image by obtaining additional depth information in the 2D camera system may be defined as a 3D camera system.

The 3D camera system may obtain both color information and depth information of a predetermined object from a single sensor. A sensor in a new integrated structure may be required for obtaining the color information and the depth information from the single sensor concurrently. The sensor in the new integrated structure may be divided into two sensors.

One of the divided sensors may include a space division based sensor. The space division based sensor may obtain color information and depth information simultaneously through a pixel for obtaining color information and a pixel for obtaining depth information distributed in a consistent pattern, in a sensor array space.

The other divided sensor may include a time division based sensor. The time division based sensor may obtain color information and depth information by dividing the color information and the depth information temporally. The time division based sensor may be provided with various functions because a single pixel is required to obtain the color information and the depth information simultaneously.

DISCLOSURE OF INVENTION

Technical Solutions

According to example embodiments, there is provided a filter, including a first filter to control a degree of absorption of a visible ray by changing a molecular array, based on a control of an electrical signal, and a second filter to control a degree of reflection of an infrared (IR) ray by changing a reflectivity, based on the control of the electrical signal.

The first filter may be configured by at least a single layer including a liquid crystal (LC) molecule and a dye molecule.

The first filter may be configured by a first layer and a second layer including an LC molecule and a dye molecule, and a molecule including the first layer and a molecule including the second layer are disposed vertically to an optical axis of a visible ray.

The first filter may dispose the LC molecule and the dye molecule for a visible ray to be absorbed in the first filter when an electrical signal to turn OFF is blocked, and dispose the LC molecule and the dye molecule for a visible ray to be transmitted to the first filter when an electrical signal to turn ON is inputted.

The first filter may dispose the LC molecule and the dye molecule to be vertical to an optical axis of a visible ray when an electrical signal to turn OFF is blocked, and dispose the LC molecule and the dye molecule to be horizontal to a progression direction of a visible ray when an electrical signal to be turn ON is inputted.

The second filter may be configured by a layer including an LC molecule and a layer including a polymer molecule.

The second filter may change a reflectivity for an IR ray to be reflected to the second filter when an electrical signal to turn OFF is blocked, and change a reflectivity for an IR ray to be transmitted to the second filter when an electrical signal to turn ON is inputted.

The second filter may set a refractive index of a layer including an LC molecule to differ from a refractive index of a layer including a polymer molecule, such that an IR ray is reflected to the second filter when an electrical signal to turn OFF is blocked, and set a refractive index of a layer including an LC molecule to be identical to a refractive index of a layer including a polymer molecule, such that an IR ray is transmitted to the second filter when an electrical signal to turn ON is inputted.

The second filter may represent a Distributed Bragg Reflector (DBR) structure, using an LC molecule and a polymer molecule.

According to example embodiments, there is provided a filter, including a first filter to absorb a visible ray by controlling an electrical signal, and a second filter to reflect an infrared (IR) ray by controlling the electrical signal.

The filter may perform turning ON/OFF of the first filter and the second filter repeatedly, based on the electrical signal, and transmit a visible ray or an IR ray selectively.

The filter may turn ON the first filter based on the electrical signal and turn OFF the second filter to transmit a visible ray for sensing a color image, and may turn OFF the first filter based on the electrical signal and turn ON the second filter to transmit an IR ray for sensing a depth image.

The first filter included in the filter may be configured by a guest-host liquid crystal (LC).

The first filter included in the filter may include an LC molecule and a dye molecule.

The second filter included in the filter may represent a Distributed Bragg Reflector (DBR) structure.

The second filter included in the filter may change a reflectivity, using the LC molecule and the polymer molecule.

According to example embodiments, there is provided a filter for transmitting a visible ray and reflecting an infrared (IR) ray, based on an electrical signal, for a sensor to sense a color image, and absorbing a visible ray and transmitting an IR ray, based on an electrical signal for a sensor to sense a depth image.

According to example embodiments, there is provided a filter, including a liquid crystal (LC) molecule of which an array is changed by a control of an electrical signal for a visible ray or an infrared (IR) ray to be transmitted selectively.

According to example embodiments, there is provided a filter, including a first filter to represent a guest-host structure for a visible ray to be transmitted based on an electrical signal, and a second filter to represent a holographic polymer dispersed liquid crystal (HPDLC) structure for an infrared (IR) ray to be transmitted based on an electrical signal.

According to example embodiments, there is provided a filter, including a first filter to transmit a visible ray based on a control of an electrical signal to sense a color image during a first time interval, and a second filter to transmit an infrared (IR) ray based on a control of an electrical signal to sense a depth image during a second time interval.

Advantageous Effects

According to example embodiments, there is provided a filter for transmitting a visible ray representing a wavelength corresponding to a color image and an infrared (IR) ray representing a wavelength corresponding to a depth image.

According to example embodiments, there is provided a filter for enhancing a color sense of a color image and an accuracy of a depth image through selectively transmitting a visible ray or an IR ray corresponding to a predetermined wavelength, based on a control of an electrical signal through being connected to a time based sensor.

BEST MODE FOR CARRYING OUT THE INVENTION

Figure 1:
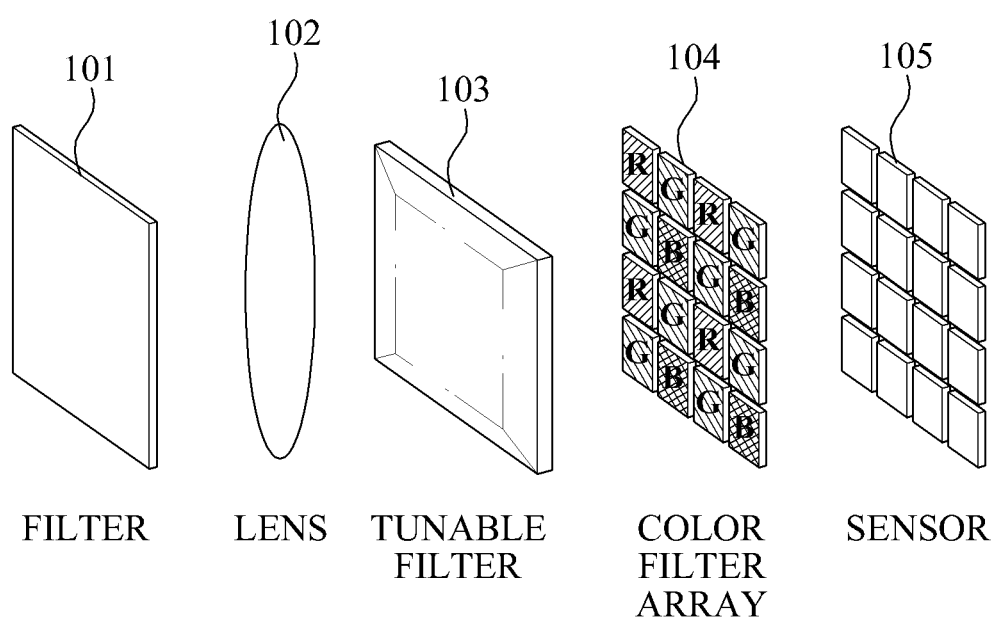
FIG. 1 is a diagram illustrating a three-dimensional (3D) camera structure according to example embodiments.

Reference will now be made in detail to example embodiments, examples of which are illustrated in the accompanying drawings, wherein like reference numerals refer to the like elements throughout. Example embodiments are described below in order to explain example embodiments by referring to the figures.

FIG. 1 is a diagram illustrating a three-dimensional (3D) camera structure according to example embodiments.

Referring to FIG. 1, a 3D camera may include a filter 101, a lens 102, a tunable filter 103, a color filter array 104, and a sensor 105. The filter according to the example embodiments may refer to the tunable filter 103.

The filter 101 disposed in front of the lens 102 may transmit light in a predetermined wavelength band. For example, the filter 101 may transmit a visible ray representing a wavelength of approximately 400 to 700 nanometers (nm) and an infrared (IR) ray representing a wavelength of approximately 800 to 900 nm. The tunable filter 103 may be controlled to transmit only one of the visible ray and the IR ray transmitted via the filter 101. For example, the tunable filter 103 may transmit only one of the visible ray and the IR ray, based on an electrical signal. The sensor 105 may sense a color image when the tunable filter 103 transmits a visible ray. When the tunable filter 103 transmits an IR ray, the sensor 105 may sense a depth image. The color filter array 104 may transmit a visible ray and an IR ray of a wavelength corresponding to red (R), green (G), and blue (B), respectively.

The sensor 105 may sense a color image based on a visible ray during a first time interval, or sense a depth image based on an IR ray during a second time interval, based on a time division scheme, through the tunable filter 103 transmitting only a visible ray during the first time interval, and transmitting only an IR ray during the second time interval.

Figure 2:
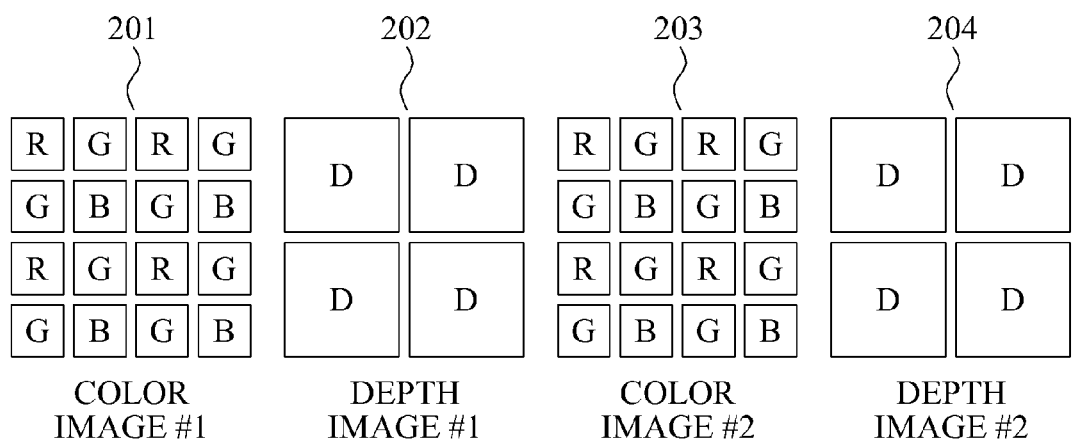
FIG. 2 is a diagram illustrating a process of sensing a color image and a depth image via a time division based sensor according to example embodiments.

FIG. 2 is a diagram illustrating a process of sensing a color image and a depth image via a time division based sensor according to example embodiments.

The sensor 105 may sense a color image 201 based on a visible ray transmitted via the tunable filter 103 during a first time interval. The sensor 105 may sense a depth image 202 based on an IR ray transmitted via the tunable filter 103 during a second time interval subsequent to the first time interval. The sensor 105 may sense a color image 203 based on a visible ray transmitted via the tunable filter 103 during a third time interval subsequent to the second time interval. The sensor 105 may sense a depth image 204 based on an IR ray transmitted via the tunable filter 103 during a fourth time interval subsequent to the third time interval.

The depth image may be sensed by calculating, into a distance, a time in which an IR ray is irradiated to an object based on a time-of-flight (TOF) scheme and returns through being reflected off of the object. Here, a near IR ray in a wavelength of 800 to 900 nm, both harmless to a human body and unrecognizable by humans, may be used as an irradiation light. In a case of the time division scheme, the tunable filter 103 may need to represent a wavelength band characteristic, such that the sensor 105 may transmit a near IR ray for sensing a depth image as well as a visible ray for sensing a color image.

Figure 3:
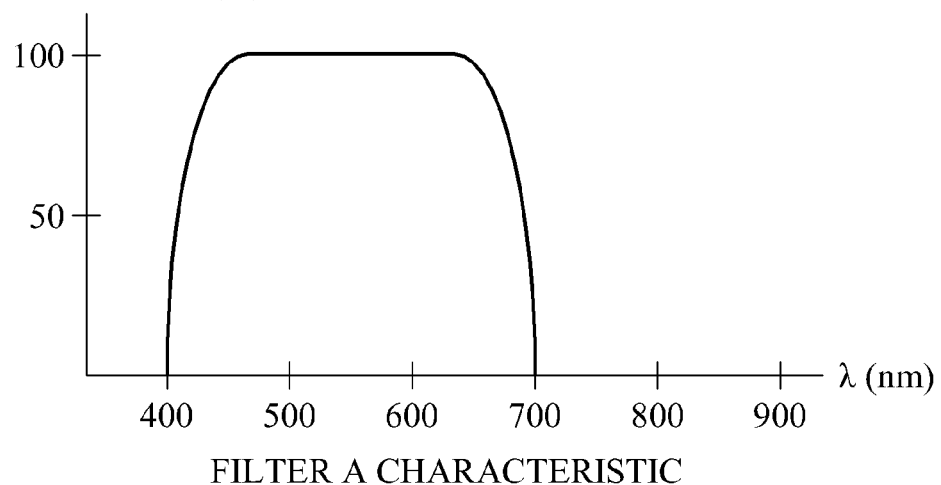
FIG. 3 is a diagram illustrating a filter characteristic for a time division based sensor according to example embodiments.
Figure 3:
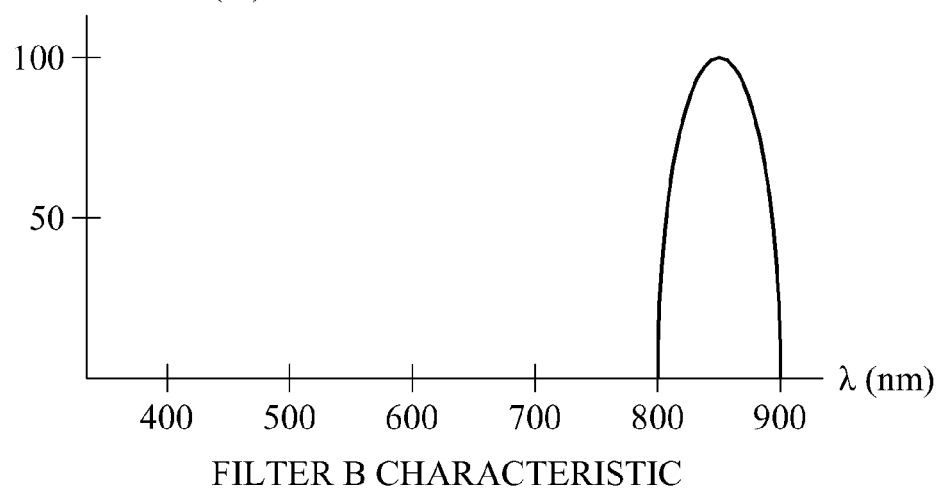

FIG. 3 is a diagram illustrating a filter characteristic for a time division based sensor according to example embodiments.

As described in FIG. 2, the tunable filter 103 may need to represent an optical filter characteristic of transmitting a visible ray and a near IR ray. A filter characteristic 301 in FIG. 3 may refer to the tunable filter 103 transmitting a visible ray corresponding to a wavelength representing 400 to 700 nm. A filter characteristic 302 may refer to the tunable filter 103 transmitting an IR ray representing 800 to 900 nm.

Here, a wavelength of a visible ray may be divided into R of which a wavelength ranges from 400 to 500 nm, G of which a wavelength ranges from 500 to 600 nm, and B of which a wavelength ranges from 600 to 700 nm.

The tunable filter 103 may transmit both of a visible ray and an IR ray optically. When the sensor 105 senses a color image, the tunable filter 103 may transmit only a visible ray selectively, and when the sensor 105 senses a depth image, the tunable filter 103 may transmit only an IR ray selectively. The tunable filter 103 may transmit a visible ray and an IR ray selectively by adaptively controlling an electrical signal to be inputted to the tunable filter 103.

Figure 4:
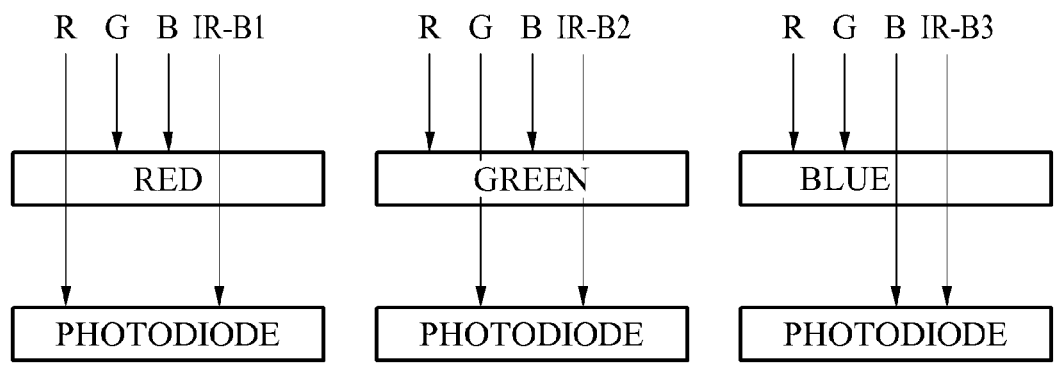
FIG. 4 is a diagram illustrating a filter characteristic required for sensing a color image and a depth image according to example embodiments.
Figure 4:
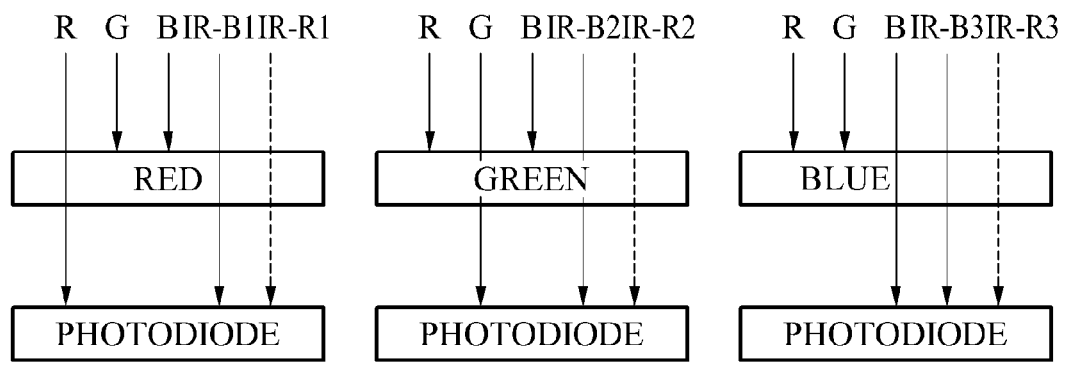

FIG. 4 is a diagram illustrating a filter characteristic required for sensing a color image and a depth image according to example embodiments.

Referring to FIG. 4, a light arriving at respective R, G, and B pixels configuring the sensor 105 when the color image and the depth image are sensed, is illustrated.

When the sensor 105 senses a color image, a visible ray and a near IR ray (background IR ray) of a wavelength corresponding to R, G, and B may arrive at the respective R, G, B pixels configuring the sensor 105 because the visible ray and the near IR ray may transmit the filter 101. The visible ray and the near IR ray may refer to a light from an environmental source being reflected off of an object. The R pixel may transmit a visible ray and a near IR ray of a wavelength corresponding to an R. The G pixel may transmit a visible ray and a near IR ray of a wavelength corresponding to G. The B pixel may transmit a visible ray and a near IR ray of a wavelength corresponding to B.

In this instance, an electric charge ($Q_{color\_red} = Q_{red} + Q_{IR\_B1}$) of the R pixel may be generated based on the visible ray of the wavelength corresponding to R, and the generated electric charge may be accumulated in a photodiode of the R pixel. In a similar manner, an electric charge ($Q_{color\_green} = Q_{green} + Q_{IR\_B2}$) of the G pixel may be generated based on a visible ray and a near IR of a wavelength corresponding to G, and the generated electric charge may be accumulated in a photodiode of the R pixel. An electric charge ($Q_{color\_blue} = Q_{blue} + Q_{IR\_B3}$) of the B pixel may be generated based on a visible ray and a near IR of a wavelength corresponding to B, and the generated electric charge may be accumulated in a photodiode of the R pixel.

The photodiode associated with a plurality of pixels may be saturated due to the near IR ray, and noise occurring due to the saturation may lead to deterioration in a unique color sense of R, and B. In particular, a color of a color image may differ from a color image from a human view due to the deterioration of the color sense. Also, blurring may occur in a color image due to a crosstalk between pixels because the near IR ray generates an electric charge in a relatively lower portion of a photodiode when compared to the visible ray.

When the sensor 105 senses a depth image, a visible ray of a wavelength corresponding to R, G, and B, a near IR ray generated by an environmental illumination, and a near IR ray generated through a near IR ray, or an irradiation light, being reflected off of an object, directly irradiated for detecting a TOF may arrive at the respective R, G, and B pixels configuring the sensor 105. An electric charge required for sensing a depth image may refer to an electric charge generated based on a near IR ray reflected off of an object.

In this instance, an electric charge ($Q_{depth\_red} = Q_{red} + Q_{IR\_B1} + Q_{IR\_R1}$) of the R pixel may be generated based on a visible ray of a wavelength corresponding to R, a near IR ray generated due to an environmental illumination, and a near IR ray reflected off of an object, and the generated electric charge may be accumulated in a photodiode of the R pixel. In a similar case, an electric charge ($Q_{depth\_green} = Q_{green} + Q_{IR\_B2} + Q_{IR\_R2}$) of the G pixel may be generated based on a visible ray of a wavelength corresponding to G, a near IR ray generated due to an environmental source, and a near IR ray reflected off of an object, and the generated electric charge may be accumulated in a photodiode of the R pixel. Also, an electric charge ($Q_{depth\_blue} = Q_{blue} + Q_{IR\_B3} + Q_{IR\_R3}$) of the B pixel may be generated based on a visible ray of a wavelength corresponding to B, a near IR ray generated due to an environmental illumination, and a near IR ray reflected off of an object, and the generated electric charge may be accumulated in a photodiode of the R pixel.

The sensor 105 may calculate a difference between an electric charge obtained when a depth image is sensed and an electric charge obtained when a color image is sensed, and extract an electric charge generated based on a near IR ray obtained through an irradiation light being reflected off of an object, based on Equation 1.

$$Q_{IR\_R1} = Q_{depth\_red} - Q_{color\_red}$$

$$Q_{IR\_R2} = Q_{depth\_green} - Q_{color\_green}$$

$$Q_{IR\_R3} = Q_{depth\_blue} - Q_{color\_blue}$$

However, when a depth image is sensed, saturation of a photodiode may occur due to an electric charge due to a visible ray and an electric charge due to an environmental illumination, and obtaining a depth image may be impossible due to the saturation of the photodiode.

Accordingly, the tunable filter 103 disposed in front of the sensor 105 may require a filter characteristic of blocking a near IR ray due to an environmental illumination and transmitting only a visible ray when sensing a color image. The tunable filter 103 may require a filter characteristic of blocking a visible ray and transmitting only an IR ray when sensing a depth image.

Figure 5:
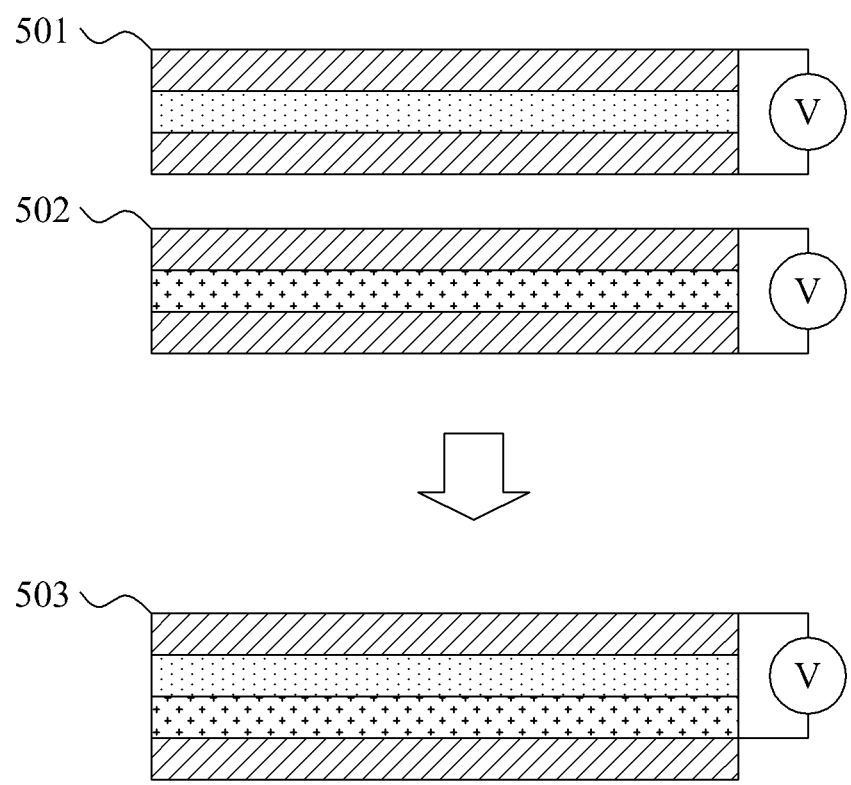
FIG. 5 is a diagram illustrating a structure of a filter according to example embodiments.

FIG. 5 is a diagram illustrating a structure of a filter according to example embodiments.

As an example embodiment, a tunable filter may include a first filter 501 transmitting a visible ray and a second filter 502 transmitting an IR ray. Here, the first filter 501 and the second filter 502 may be controlled based on an electrical signal. The electrical signal may be adjusted based on turning ON/OFF of a voltage. A tunable filter 503 may be used in a structure in which the first filter 501 and the second filter 502 are combined.

Hereinafter, a detailed structure of the tunable filter 503 shown in FIG. 5 will be described in detail.

Figure 6:
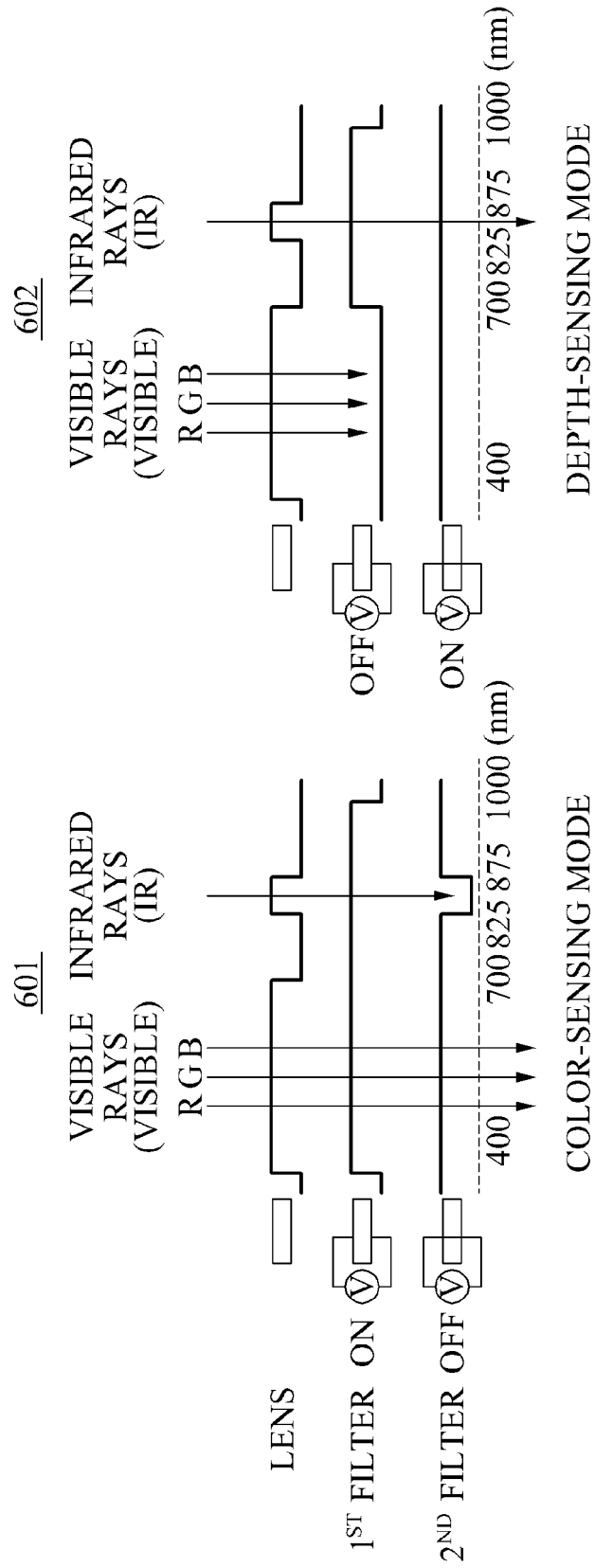
FIG. 6 is a diagram illustrating an example of an operation of a filter when a color image is sensed and when a depth image is sensed according to example embodiments.

FIG. 6 is a diagram illustrating an example of an operation of a filter when a color image is sensed and when a depth image is sensed according to example embodiments.

Referring to FIG. 6, an operation of the tunable filter 103 when a sensor is turned ON in a color-sensing mode 601 of sensing a color image and an operation of the tunable filter 103 when a sensor is turned ON in a depth-sensing mode 602 of sensing a depth image are illustrated. The tunable filter 103 may include a first filter absorbing a visible ray and a second filter reflecting an IR ray.

On the color-sensing mode 601, an electrical signal is inputted to the first filter of the tunable filter 103 and the first filter may be turned ON, and an electrical signal to the second filter is blocked and the second filter may be turned OFF. A visible ray transmitted via a lens may be transmitted to the first filter without being absorbed by the first filter. An IR ray transmitted via the lens may fail to be transmitted to the second filter through being reflected to the second filter.

Accordingly, on the color-sensing mode 601, the tunable filter 103 may transmit a visible ray only, and the sensor 105 may sense a color image using the transmitted visible ray.

On the depth-sensing mode 602, an electrical signal to the first filter is blocked of the tunable filter 103 and the first filter may be turned OFF, and an electrical signal is inputted to the second filter and the second filter may be turned ON. A visible ray transmitted via the lens may fail to be transmitted to the first filter through being absorbed by the first filter. An IR ray transmitted via the lens may be transmitted to the second filter without being reflected to the second filter. Accordingly, on the depth-sensing mode 602, the tunable filter 103 may transmit an IR ray only, and the sensor 105 may sense a depth image, using the IR ray transmitted.

Figure 7:
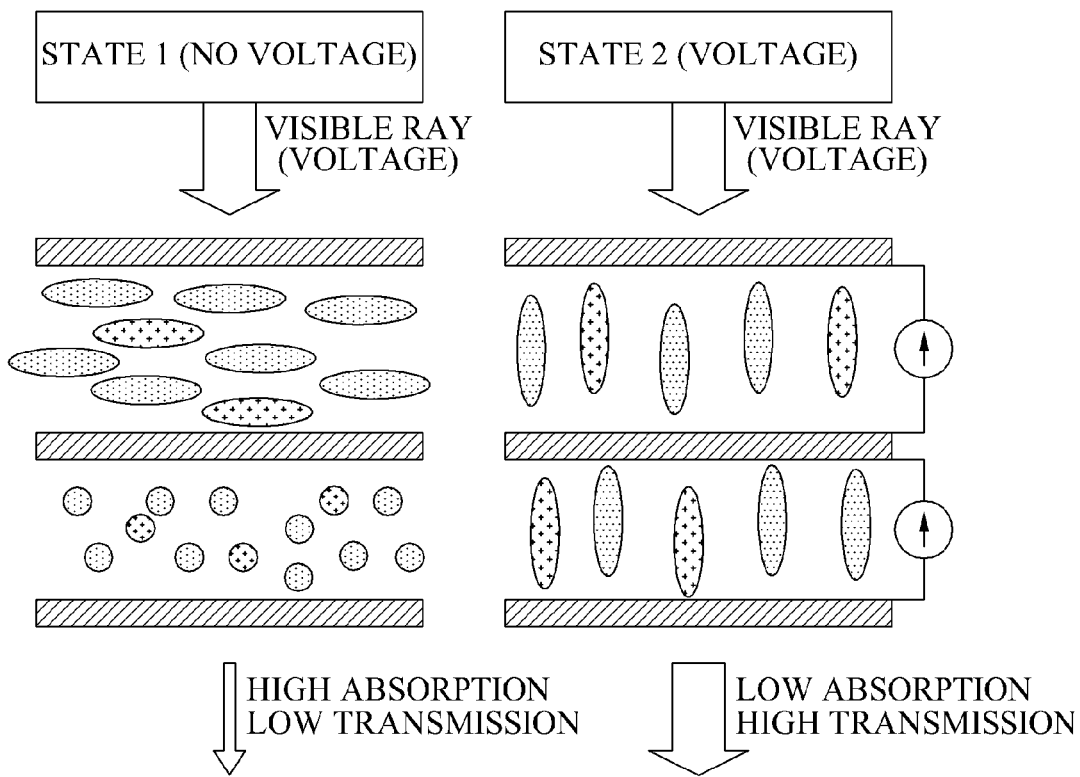
FIG. 7 is a diagram illustrating a first filter configuring a filter according to example embodiments.

FIG. 7 is a diagram illustrating a first filter configuring a filter according to example embodiments.

Referring to FIG. 7, the first filter configuring the tunable filter 103 on a depth-sensing mode 701 and the first filter configuring the tunable filter 103 on a sensing-mode 702 are illustrated. Here, the first filter may absorb a visible ray, based on a control of an electrical signal.

The first filter may include a plurality of LC molecules and a plurality of dye molecules. The first filter may represent a guest-host LC structure. The plurality of LC molecules may be controlled based on an electrical signal, and the plurality of dye molecules may absorb a visible ray corresponding to an RGB wavelength.

Here, the first filter may be configured by a first layer and a second layer including the plurality of LC molecules and the plurality of dye molecules. The plurality of LC molecules and the plurality of dye molecules included in the first layer and the second layer may be disposed differently.

On the depth-sensing mode 701, an electrical signal to the first filter is blocked, and the first filter may be turned OFF. A plurality of molecules included in the first layer and a plurality of molecules included in the second layer may be disposed orthogonally with respect to an optical axis of a visible ray. In this instance, only a portion of a visible ray arriving at the first filter may be transmitted through a relatively significant amount of the visible ray remaining being absorbed by a dye molecule. As an example, on the depth-sensing mode 701, a total of the visible ray arriving at the first filter may be absorbed and therefore fail to be transmitted. When an electrical signal to the first filter is blocked and the first filter may be turned OFF, an LC molecule and a dye molecule included in the first filter may be disposed for the visible ray to be absorbed.

On the color-sensing mode 702, an electrical signal is inputted to the first filter and the first filter may be turned ON. A plurality of molecules included in the first layer and a plurality of molecules included in the second layer may be disposed in a vertical direction with respect to an optical axis of the visible ray. In this instance, only a portion of the visible ray arriving at the first filter may be absorbed by the dye molecule, and a relatively significant amount of the visible ray may be transmitted.

As an example, on the color-sensing mode 702, a total of the visible ray arriving at the first filter may be transmitted. When an electrical signal is inputted to the first filter and the first filter is turned ON, an LC molecule and a dye molecule included in the first filter may be disposed for the visible ray to be transmitted.

The first filter may adjust a degree of absorption of a visible ray by changing a molecular array, based on a control of an electrical signal.

Figure 8:
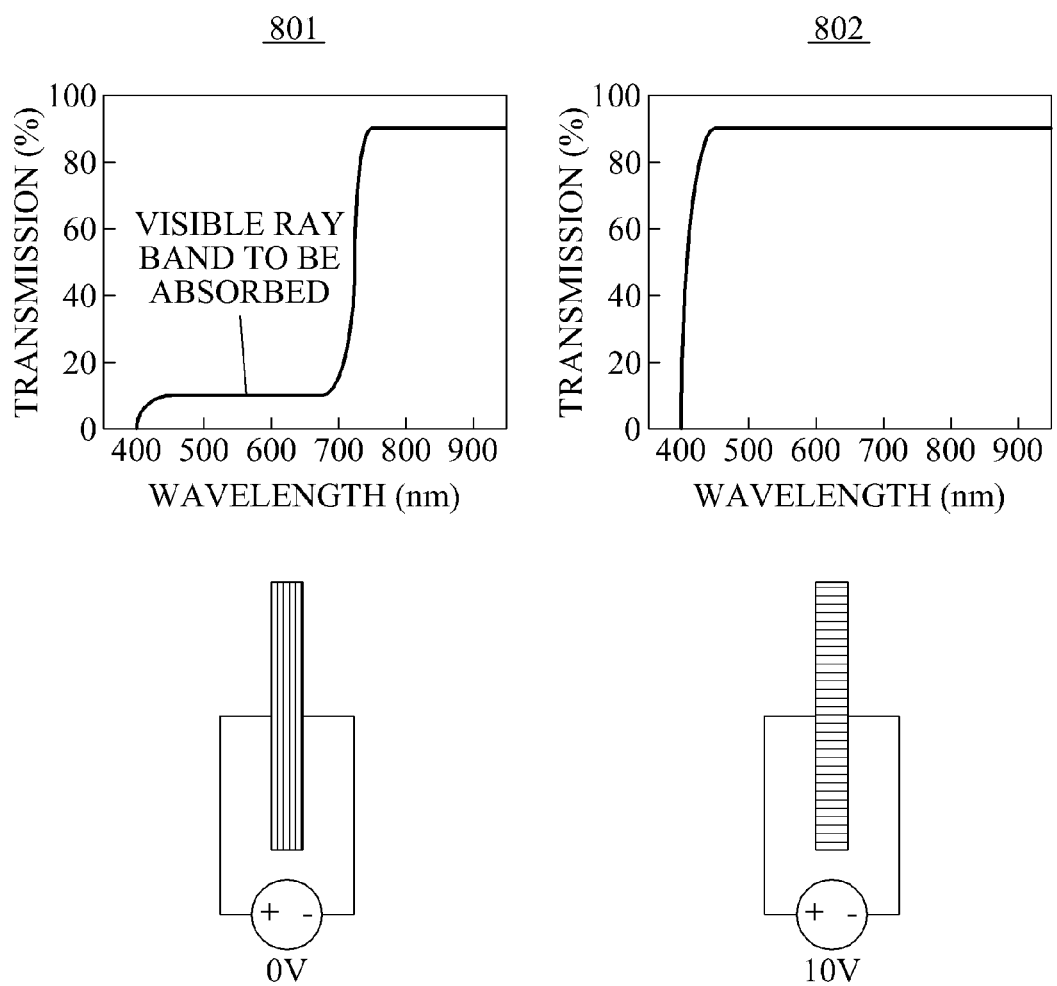
FIG. 8 is a diagram illustrating an operating scheme of the first filter of FIG. 7 based on an electrical signal.

FIG. 8 is a diagram illustrating an operating scheme of the first filter of FIG. 7 based on an electrical signal.

Referring to FIG. 8, an operation of the first filter on a depth-sensing mode 801 and a light transmitting the first filter are illustrated. An operation of the first filter on a color-sensing mode 802 and a light transmitting the first filter are illustrated in FIG. 8.

Referring to FIG. 8, an electrical signal to the first filter is blocked, and the first filter may be turned OFF on the depth-sensing mode 801. An LC molecule and a dye molecule included in the first filter may be disposed vertically to an optical axis of a visible ray. Accordingly, a wavelength of the visible ray arriving at the first filter may range from 400 to 700 nm, and a relatively significant amount of the visible ray may be transmitted through being absorbed by the dye molecule disposed vertically based on the electrical signal.

On the color-sensing mode 802, an electrical signal is inputted to the first filter, and the first filter may be turned ON. The LC molecule and the dye molecule included in the first filter may be disposed horizontally to an optical axis of the visible ray. Accordingly, a relatively significant amount of the visible ray arriving at the first filter may be transmitted without being absorbed by the dye molecule disposed horizontally to the optical axis of the visible ray, based on the electrical signal. Here, a wavelength of the visible ray may range from 400 to 700 nm. A total of an IR ray may be transmitted irrespective of a state of a filter because the IR ray fails to be absorbed by the dye molecule.

Figure 9:
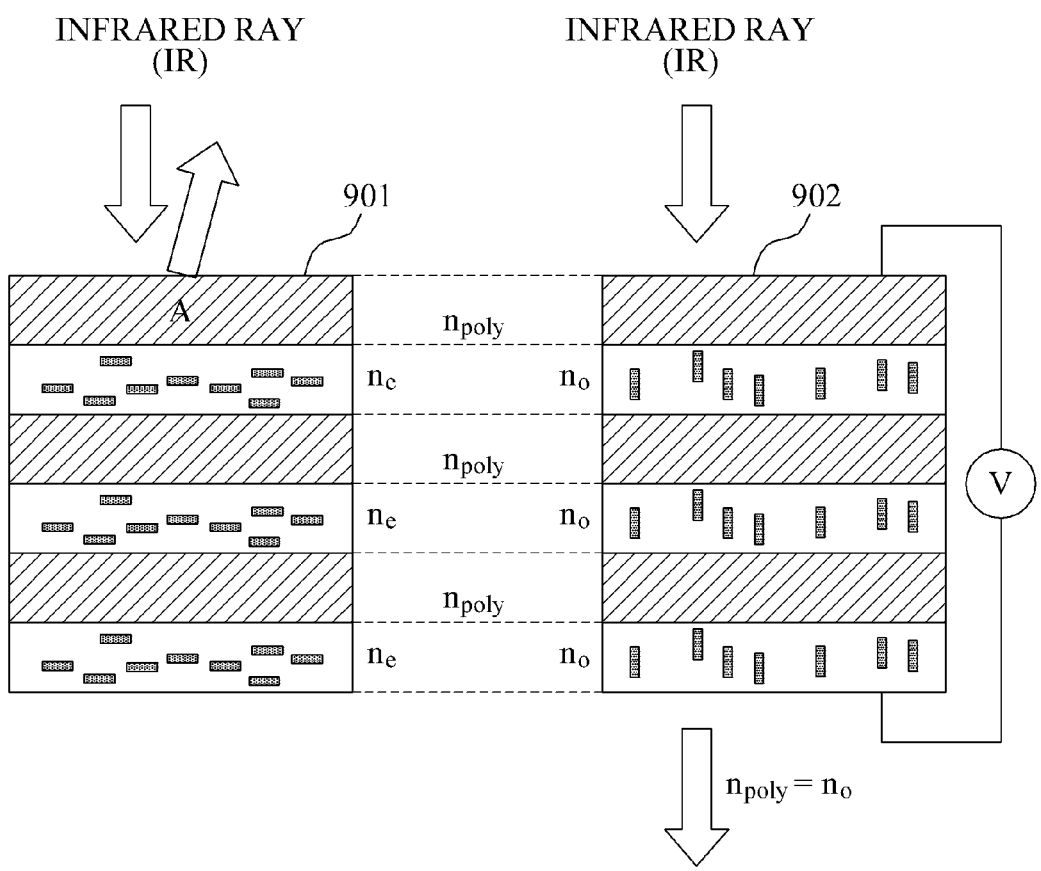
FIG. 9 is a diagram illustrating a second filter configuring a filter according to example embodiments.

FIG. 9 is a diagram illustrating a second filter configuring a filter according to example embodiments.

Referring to FIG. 9, the second filter configuring the tunable filter 103 on a color-sensing mode 901 and the second filter configuring the tunable filter 103 on a depth-sensing mode 902 are illustrated. Here, the second filter may reflect an IR ray, based on a control of an electrical signal.

The second filter may be configured by a layer "A" including a polymer molecule and a layer "B" including an LC molecule. Here, the layer "A" including the polymer molecule and the layer "B" including the LC molecule may be at least one. In this example, a refractive index of the layer "A" including the polymer molecule and the layer "B" including the LC molecule may vary based on a control of the electrical signal.

As an example, the second filter may have a holographic polymer dispersed liquid crystal (HPDLC) structure. The second filter may implement a Distributed Bragg Reflector (DBR), using the layer including the polymer molecule and the layer including the LC molecule.

On the color-sensing mode 901, an electrical signal to the second filter may be blocked and the second filter may be turned OFF. When the electrical signal is blocked, the LC molecule may be disposed vertically to an optical axis of an IR ray. A refractive index $n_{poly}$ of the layer including the polymer molecule may differ from a refractive index $n_e$ of the layer including the LC molecule in the second filter. Only a portion of an IR ray arriving at the second filter may be transmitted and a relatively significant amount of the IR ray remaining may be reflected. As an example, on the color-sensing mode 901, a total of the IR ray arriving at the second filter may be reflected and fail to be transmitted. When an electrical signal to the second filter is blocked and the second filter is turned OFF, a refractive index $n_{poly}$ of the layer including the polymer molecule may differ from a refractive index $n_e$ of the layer including the LC molecule, such that the IR ray may be reflected.

On the depth-sensing mode 902, an electrical signal is inputted to the second filter and the second filter may be turned ON. When the electrical signal is inputted, the LC molecule may be disposed horizontally to the optical axis of the IR ray. The refractive index $n_{poly}$ of the layer including the polymer molecule and a refractive index $n_o$ of the layer including the LC molecule may be changed identically in the second filter. Only a portion of the IR ray arriving at the second filter may be reflected off of the second filter, and a relatively significant amount of the IR ray may be transmitted through the second filter. As an example, on the depth-sensing mode 901, a total of the IR ray arriving at the second filter may be transmitted. When an electrical signal is inputted to the second filter and the second filter is turned ON, the refractive index $n_{poly}$ of the layer including the polymer molecule and the refractive index $n_o$ of the layer including the LC molecule may be changed identically, such that the IR ray may be transmitted to the second filter.

Figure 10:
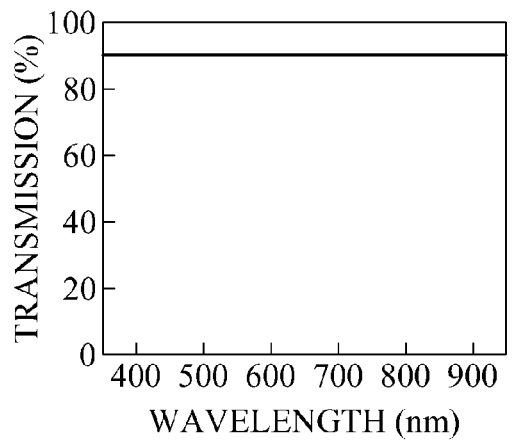
FIG. 10 is a diagram illustrating an operating scheme of the second filter of FIG. 9, based on an electrical signal according to example embodiments.
Figure 10:
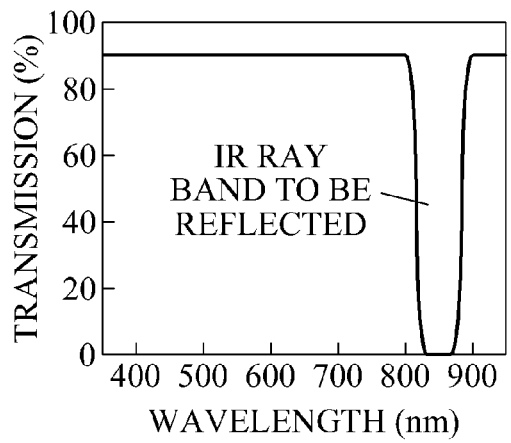
Figure 10:
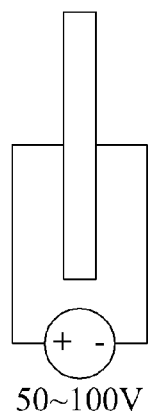
Figure 10:
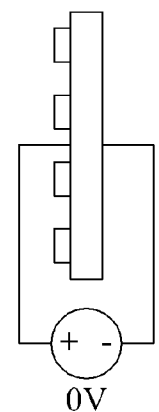

FIG. 10 is a diagram illustrating an operating scheme of the second filter of FIG. 9, based on an electrical signal according to example embodiments.

Referring to FIG. 10, an operation of the second filter on a depth-sensing mode 1001 and a light being transmitted to the second filter are illustrated. An operation of the second filter on a color-sensing mode 1002 and a light being transmitted to the second filter are also illustrated in FIG. 10.

Referring to FIG. 10, on the depth-sensing mode 1001, an electrical signal is inputted to the second filter and the second filter may be turned ON. The refractive index $n_{poly}$ of the layer including the polymer molecule included in the second filter and the refractive index $n_o$ of the layer including the LC molecule may be changed identically. Accordingly, a relatively significant amount of the IR ray arriving at the second filter may be transmitted through the second filter without being reflected to the layer including the polymer molecule and the layer including the LC molecule of which the refractive index is changed identically based on the electrical signal. Here, a wavelength of the IR ray may range from 800 to 900 nm.

On the color-sensing mode 1002, an electrical signal to the second filter is blocked, and the second filter may be turned OFF. The refractive index $n_{poly}$ of the layer including the polymer molecule included in the second filter may differ from the refractive index $n_e$ of the layer including the LC molecule. Accordingly, a relatively significant amount of the IR ray arriving at the second filter may be reflected without being transmitted to the second filter due to the layer including the polymer molecule and the layer including the LC molecule of which the refractive index is changed differently based on the electrical signal.

Figure 11:
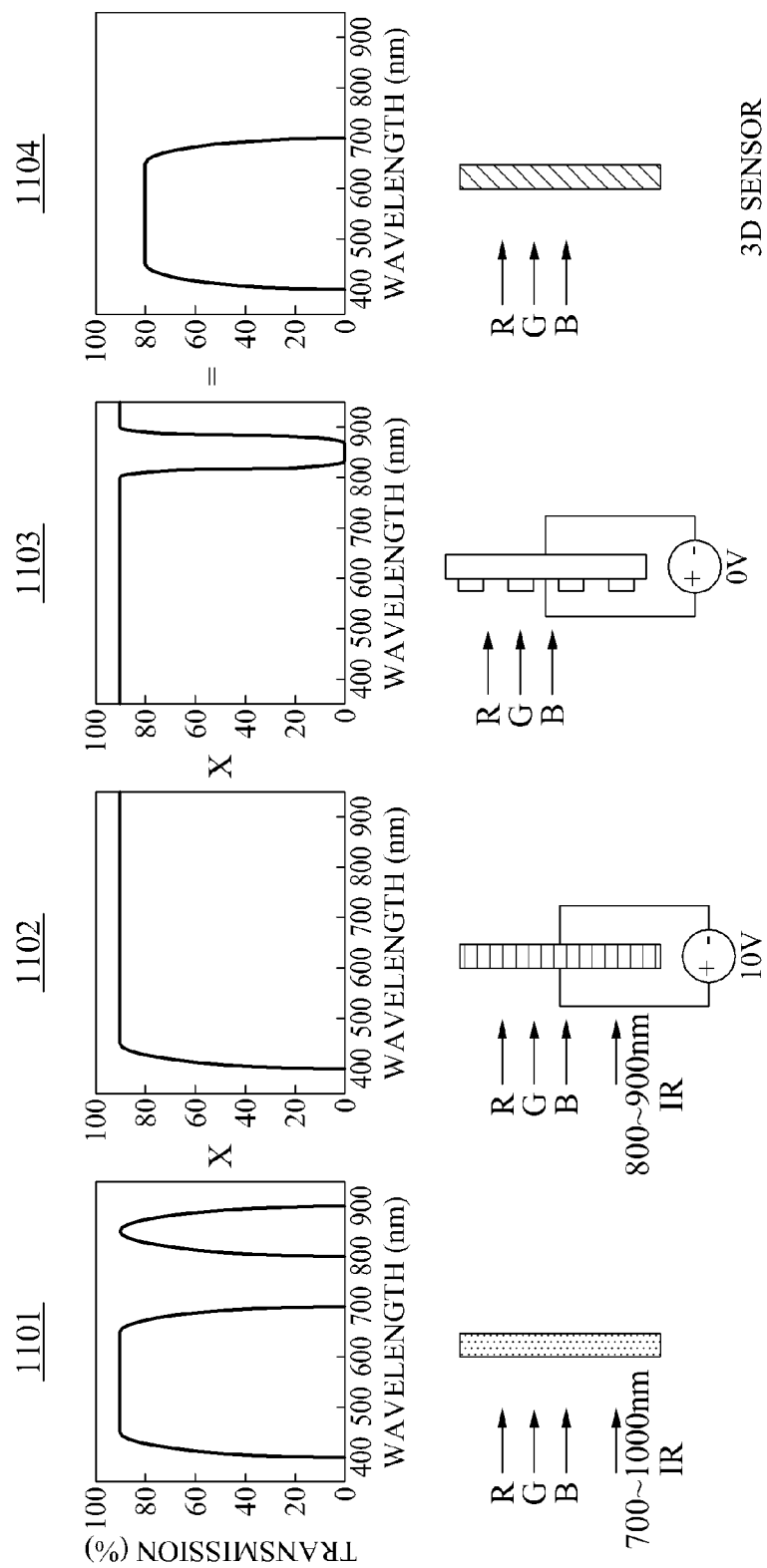
FIG. 11 is a diagram illustrating a process of sensing a color image, based on a time division scheme according to example embodiments.

FIG. 11 is a diagram illustrating a process of sensing a color image based on a time division scheme according to example embodiments.

In operation 1101, the first 101 may transmit a visible ray and an IR ray.

In operation 1102, the first filter configuring the tunable filter 103 may be turned ON based on a control of an electrical signal as shown in FIG. 6 for the sensor 105 to sense a color image. Here, the first filter may absorb a visible ray, based on the control of the electrical signal.

When the first filter is turned ON, a relatively significant amount of a visible ray arriving at the first filter may be transmitted without being absorbed by the first filter because an LC molecule and a dye molecule configuring the first filter may be disposed horizontally to an optical axis of the visible ray. An IR ray arriving at the first filter may be transmitted to the first filter because the dye molecule fails to absorb the IR ray.

In operation 1103, the second filter configuring the tunable filter 103 may be turned OFF based on a control of an electrical signal for the sensor 105 to sense a color image.

Here, the second filter may reflect an IR ray, based on a control of an electrical signal.

When the second filter is turned OFF, the refractive index $n_{poly}$ of the layer including the polymer molecule configuring the second filter may be changed differently from the refractive index $n_e$ of the layer including the LC molecule. The IR ray arriving at the second filter may fail to be transmitted to the second filter, and a relatively significant amount of the IR ray may be reflected. The visible ray arriving at the second filter may be transmitted to the second filter.

In operation 1104, a visible ray transmitting the first filter and the second filter may arrive at the sensor 105 through the color filter array 104. The sensor 105 may sense a color image, using a visible ray.

Figure 12:
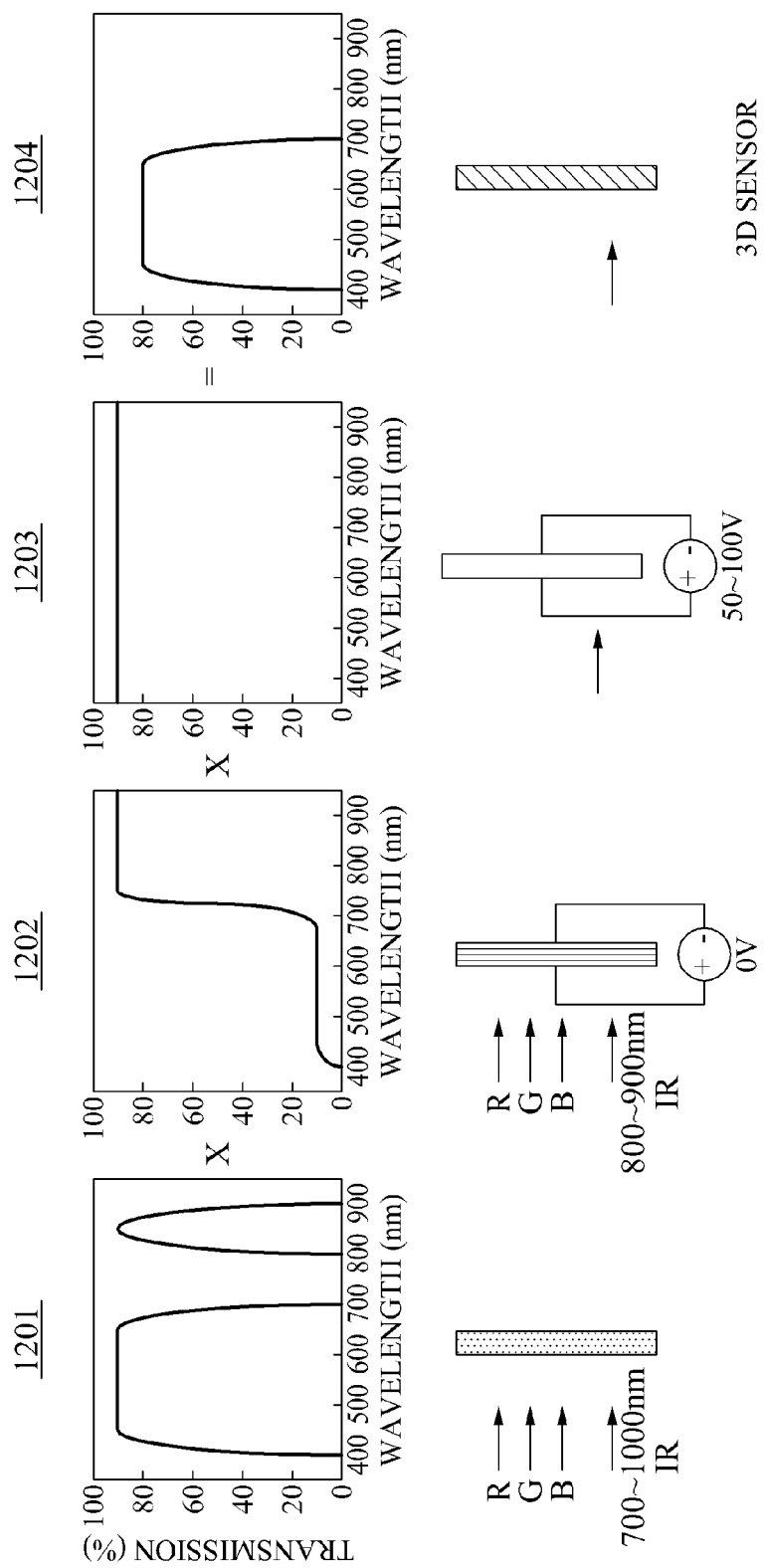
FIG. 12 is a diagram illustrating a process of sensing a depth image, based on a time division scheme according to example embodiments.

FIG. 12 is a diagram illustrating a process of sensing a depth image, based on a time division scheme according to example embodiments.

The sensor 105 may sense both a color image and a depth image through performing operations of FIGS. 11 and 12 repeatedly for a predetermined time interval.

In operation 1201, the filter 101 may transmit a visible ray and an IR ray.

In operation 1202, the first filter configuring the tunable filter 103 may be turned OFF based on a control of an electrical signal as shown in FIG. 6 for the sensor 105 to sense a depth image. Here, the first filter may absorb a visible ray, based on the control of the electrical signal.

When the first filter is turned OFF, a relatively significant amount of a visible ray arriving at the first filter may be absorbed by the first filter because an LC molecule and a dye molecule configuring the first filter may be disposed vertically to an optical axis of a visible ray. An IR ray arriving at the first filter may be transmitted to the first filter because the dye molecule fails to absorb the IR ray.

In operation 1103, the second filter configuring the tunable filter 103 may be turned ON based on a control of an electrical signal for the sensor 105 to sense a depth image. Here, the second filter may reflect an IR ray, based on the control of the electrical signal.

When the second filter is turned ON, the refractive index $n_{poly}$ of the layer including the polymer molecule configuring the second filter and the refractive index $n_e$ of the layer including the LC molecule may be changed identically. A relatively significant amount of the IR ray arriving at the second filter may be transmitted without being reflected to the second filter. The visible ray arriving at the second filter may be almost absent because a relatively significant amount of the visible ray may be absorbed by the first filter.

In operation 1104, an IR ray transmitting the first filter and the second filter may arrive at the sensor 105 through the color filter array 104. The sensor 105 may sense a depth image, using an IR ray.

Example embodiments include computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of computer-readable media include magnetic media such as hard disks, floppy disks, and magnetic tape; optical media such as CD ROM discs; magneto-optical media such as floptical discs; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

The invention claimed is:

1. A tunable filter, comprising:
a first filter configured to control a degree of absorption of a visible ray by changing a molecular array, based on a control of an electrical signal; and
a second filter configured to control a degree of reflection of an infrared (IR) ray by changing a reflectivity, based on the control of the electrical signal,
wherein the first filter is configured by a first layer and a second layer each including an LC molecule and a dye molecule, and
the molecules included in the first layer and the molecules included in the second layer are disposed vertically to an optical axis of a visible ray.

2. The tunable filter of claim 1, wherein the first filter is configured by at least a single layer including a liquid crystal (LC) molecule and a dye molecule.

3. The tunable filter of claim 1, wherein the first filter is configured to dispose the LC molecule and the dye molecule for a visible ray to be absorbed in the first filter when turned OFF by the electrical signal, and
dispose the LC molecule and the dye molecule for a visible ray to be transmitted to the first filter when turned ON by the electrical signal.

4. The tunable filter of claim 1, wherein the first filter is configured to dispose the LC molecule and the dye molecule to be vertical to an optical axis of a visible ray when turned OFF by the electrical signal, and
dispose the LC molecule and the dye molecule to be horizontal to a progression direction of a visible ray when turned ON by the electrical signal.

5. The tunable filter of claim 1, wherein the second filter is configured by a layer including an LC molecule and a layer including a polymer molecule.

6. The tunable filter of claim 1, wherein the second filter is configured to change a reflectivity for an IR ray to be reflected to the second filter when turned OFF by the electrical signal, and
change a reflectivity for an IR ray to be transmitted to the second filter when turned ON by the electrical signal.

7. The tunable filter of claim 1, wherein the second filter is configured to
set a refractive index of a layer including an LC molecule to differ from a refractive index of a layer including a polymer molecule such that the IR ray is reflected to the second filter when turned OFF by the electrical signal, and
set a refractive index of a layer including an LC molecule to be identical to a refractive index of a layer including a polymer molecule such that the IR ray is transmitted to the second filter when turned ON by the electrical signal.

8. The tunable filter of claim 1, wherein the second filter represents a Distributed Bragg Reflector (DBR) structure, using an LC molecule and a polymer molecule.

9. A camera, comprising:
a first filter configured to absorb a visible ray based on a control of an electrical signal;
a second filter configured to reflect an infrared (IR) ray based on a control of the electrical signal; and
a sensor configured to sense at least one of a color image and a depth image,
wherein when sensing the color image, the first filter and the second filter are configured to transmit the visible ray and the second filter is further configured to reflect the IR ray, and
wherein when sensing the depth image, the first filter and the second filter are configured to transmit the IR ray and the first filter is further configured to absorb the visible ray.

10. The camera of claim 9, wherein the filter is configured to perform turning ON/OFF of the first filter and the second filter repeatedly, based on the electrical signal, and transmit a visible ray or an IR ray selectively.

11. The camera of claim 9, wherein the filter is configured to turn ON the first filter based on the electrical signal, and turn OFF the second filter to transmit a visible ray for sensing a color image, and
turn OFF the first filter based on the electrical signal, and turn ON the second filter to transmit an IR ray for sensing a depth image.

12. The camera of claim 9, wherein the first filter comprises an LC molecule and a dye molecule.

13. The camera of claim 9, wherein the second filter represents a Distributed Bragg Reflector (DBR) structure.

14. The camera of claim 9, wherein the second filter is configured to change a reflectivity of a filter, using an LC molecule and a polymer molecule.

15. The tunable filter of claim 1, wherein the first filter has a guest-host structure which is configured to transmit the visible ray based on the electrical signal.

16. The tunable filter of claim 1, wherein the second filter has a holographic polymer dispersed liquid crystal (HPDLC) structure, which is configured to transmit the infrared (IR) ray based the electrical signal.

17. The tunable filter of claim 15, wherein the second filter has a holographic polymer dispersed liquid crystal (HPDLC) structure, which is configured to transmit the infrared (IR) ray based the electrical signal.

18. The tunable filter of claim 1, wherein
the first filter is configured to transmit the visible ray based on the control of the electrical signal to sense a color image during a first time interval; and
the second filter configured to transmit the infrared (IR) ray based on the control of the electrical signal to sense a depth image during a second time interval.

19. A filter, comprising:
a first filter configured to absorb a visible ray by controlling an electrical signal; and
a second filter configured to reflect an infrared (IR) ray by controlling the electrical signal,
wherein the second filter is configured to
set a refractive index of a layer including an LC molecule to differ from a refractive index of a layer including a polymer molecule such that the IR ray is reflected to the second filter when turned OFF by the electrical signal, and
set a refractive index of a layer including an LC molecule to be identical to a refractive index of a layer including a polymer molecule such that the IR ray is transmitted to the second filter when turned ON by the electrical signal.

\* \* \* \* \*